United States Patent
Holm et al.

(10) Patent No.: US 7,864,633 B2
(45) Date of Patent: Jan. 4, 2011

(54) SYSTEM AND METHOD FOR POSITION DETERMINATION OF OBJECTS

(75) Inventors: Sverre Holm, Asker (NO); Rune Holm, Asker (NO); Ole Hovind, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 12/422,643

(22) Filed: Apr. 13, 2009

(65) Prior Publication Data

US 2009/0201765 A1 Aug. 13, 2009

Related U.S. Application Data

(60) Division of application No. 11/841,360, filed on Aug. 20, 2007, now Pat. No. 7,535,796, which is a continuation of application No. 10/510,052, filed on Mar. 28, 2003, now Pat. No. 7,283,423.

(30) Foreign Application Priority Data

Apr. 9, 2002 (NO) .................................. 20021672

(51) Int. Cl.
*G01S 3/80* (2006.01)
(52) U.S. Cl. ..................................... 367/124
(58) Field of Classification Search .................. 367/124, 367/127
See application file for complete search history.

(56) References Cited

U.S. PATENT DOCUMENTS

| 4,459,853 A | 7/1984 | Miwa |
| 4,860,266 A | 8/1989 | Drefahl |
| 5,051,741 A | 9/1991 | Wesby |
| 5,091,890 A | 2/1992 | Dwyer |
| 5,119,104 A | 6/1992 | Heller |
| 5,245,317 A | 9/1993 | Chidley |
| 5,418,758 A | 5/1995 | Webster |
| 5,528,232 A | 6/1996 | Verma et al. |

(Continued)

FOREIGN PATENT DOCUMENTS

GB 2265038 9/1993

(Continued)

OTHER PUBLICATIONS

P. Flikkema, "Spread-spectrum techniques for wireless communication," IEEE Signal Proc. Mag., May 1997.

(Continued)

*Primary Examiner*—Dan Pihulic
(74) *Attorney, Agent, or Firm*—O'Shea Getz P.C.

(57) ABSTRACT

A method and a system for detection and position determination of chips, which transmit ultrasound signals in a room. The system comprises electronic identification chips, which are attached to objects that have to be monitored. Each chip is equipped with a transmitter and a receiver. The signals are received by a plurality of detector units, which are connected to a detector base unit that registers and interprets the signals transmitted form the identification chips. Detector base units located in different rooms are interconnected in a network and transmit processed information to one or more central units for further interpretation and sorting. The special feature of the invention is that line interference is substantially removed, and it is possible to determine position even though the identification chips are in motion.

12 Claims, 4 Drawing Sheets

U.S. PATENT DOCUMENTS

| | | | |
|---|---|---|---|
| 5,557,637 | A | 9/1996 | Glynn |
| 5,583,517 | A | 12/1996 | Yokev et al. |
| 5,920,287 | A | 7/1999 | Belcher |
| RE36,791 | E | 7/2000 | Heller |
| 6,121,926 | A | 9/2000 | Belcher |
| 6,141,293 | A | 10/2000 | Amorai-Moriya |
| 6,317,386 | B1 | 11/2001 | Ward |
| 6,433,689 | B1 | 8/2002 | Hovind et al. |
| 6,438,491 | B1 | 8/2002 | Farmer |
| 6,470,002 | B1 | 10/2002 | Jones et al. |
| 6,532,192 | B1* | 3/2003 | Reid ............... 367/127 |
| 6,674,687 | B2* | 1/2004 | Zeitzew ............... 367/6 |
| 6,678,209 | B1 | 1/2004 | Peng et al. |
| 6,710,719 | B1 | 3/2004 | Jones et al. |
| 6,724,688 | B2 | 4/2004 | Betts et al. |
| 6,731,124 | B2 | 5/2004 | Donners |
| 6,819,629 | B2 | 11/2004 | Cummings et al. |
| 7,283,423 | B2 | 10/2007 | Holm et al. |
| 2004/0090865 | A1 | 5/2004 | Davies et al. |
| 2005/0141345 | A1 | 6/2005 | Holm et al. |
| 2006/0013070 | A1 | 1/2006 | Holm et al. |
| 2006/0077759 | A1 | 4/2006 | Holm |
| 2008/0049555 | A1 | 2/2008 | Holm et al. |
| 2009/0201765 | A1* | 8/2009 | Holm et al. ............... 367/124 |

FOREIGN PATENT DOCUMENTS

| | | |
|---|---|---|
| GB | 2298098 | 8/1996 |
| WO | WO 02/04975 | 1/2002 |

OTHER PUBLICATIONS

Freitag et al. "Analysis of channel effects on direct-sequence and frequency-hopped spread-spectrum acoustic communication," IEEE Journ. Ocean. Eng., Oct. 2001.

N. M. Vallidis "WHISPER: A Spread Spectrum Approach to Occlusion in Acoustic Tracking", University of North Carolina at Chapel Hill, Department of Computer Science, 2002.

R. Palmer, "A spread spectrum acoustic ranging system—An overview," Proc. 2002 IEEE Canadian Conference on Electrical & Computer Engineering, May 2002.

* cited by examiner

SYSTEM AND METHOD FOR POSITION DETERMINATION OF OBJECTS

This application is a divisional of U.S. Pat. No. 7,535,796, issued May 19, 2009 Ser. No. 11/841,360, filed Aug. 20, 2007, which is a continuation of Ser. No. 10/510,052 filed Mar. 28, 2003, now U.S. Pat. No. 7,283,423, issued Oct. 16, 2007, both of which are hereby incorporated by reference in their entirety.

BACKGROUND OF THE INVENTION

1. Technical Field

The invention relates to a method and a system for surveillance and position determination of objects and/or living beings within a restricted area, such as, e.g., a room in a building. The system comprises a plurality of electronic identification chips that are attached to the objects which have to be monitored. Each chip has its own identification code (ID code) and is equipped with its own ultrasound transmitter and receiver. The system further comprises a plurality of detectors in each room for registering and interpreting the signals transmitted from the chips. The detectors are interconnected in a network and transmit the information received to one or more central units also included in the system for further processing and sorting. By means of the invention, line interference from electrical equipment, which may arise when the signals are transmitted from transmitter units to detectors, will be substantially removed, in addition to which it is possible to determine position even though the identification chips are in motion.

2. Background Information

In hospitals and other places there may be a great deal of equipment and case records which are constantly being relocated. A lot of time is wasted in finding the equipment. It is therefore expedient to have a flexible system that can determine the position of various units.

In areas where there is electronic equipment that is sensitive to electromagnetic radiation, it is inadvisable to introduce new equipment that generates such radiation, such as a transceiver based on radio waves. The measurements of the new equipment in turn will be influenced by the existing equipment.

Systems based on ultrasound will be suitable, since they will not be affected by electromagnetic radiation and will have little effect on the environment.

A weakness of known systems based on ultrasound is that the results of the measurements will be influenced by noise sources such as fluorescent tubes and computer screens. This will detract from the quality of the received signals. Another shortcoming of known systems is that they will not work when the chip transmitting the signals is in motion.

An object of the invention is to reduce the influence of noise sources to a minimum.

A second object is to perform position determination even though the chip whose position has to be determined is in motion.

There are various principles currently in use for localizing objects within a restricted area.

These include systems that employ ultrasound as signal carrier. WO-9955057, which is the applicant's own patent and of which the present invention is a further development, is an example of this. This publication describes the state of the art, and is incorporated herein in its entirety as a reference. This system, like the present invention, is also intended for surveillance and position determination of objects within a restricted area by means of chips that transmit a specific ID code in the form of ultrasound signals. The chips have continuous transmission of signals at predetermined intervals, and comprise ultrasound receivers as well as means for transmitting sound in the audible range in order to issue a warning when an attempt is made to remove a chip. The code is not transmitted after an expected period or the wrong code is transmitted. Stationary receiver units placed in each defined area are connected to a central control unit via a network and perform a two-way communication with the identification chips. In a special embodiment a specific chip can be called up from the central control unit. Calling signals are then transmitted from the stationary receiver units, and the chip with the correct ID replies. The receiver receiving the strongest signal indicates in which defined area the chip is located.

As stated above, WO-9955057 concerns a system that can localize chips to a specific room. A weakness of the system is that it cannot determine the position of chips in different parts of a room.

Other systems, including U.S. Pat. No. 6,317,386, are also known, which employ precise measurement of time delays between a transmitter and several receivers for detecting precise localization in the cm range. The drawback of these systems is that they require precise localization of all the receivers in advance, complicated signal processing and they only work when there is an unobstructed view between transmitter and receivers.

Another shortcoming of communication systems of the type based on ultrasound is that they are sensitive to line noise from, for example, computer screens, TV monitors and electronic ballast circuits in fluorescent tubes. These may transmit a constant tone between 20 and 50 kHz, and if the frequency is close enough to one of the frequencies employed in chips, it will create problems for detection or a serious degree of uncertainty in the measurements.

A problem with known solutions for detecting units that are transmitting ultrasound signals arises when they are in motion. This prevents the signals from being interpreted due to Doppler shift.

Another problem with the prior art arises when there are detectors in neighboring rooms where the doors are open. In this case several detectors can hear a signal from a chip. To obtain reliable position determination is therefore no easy matter.

DISCLOSURE OF THE INVENTION

The present invention relates to a method and a system for surveillance and position determination of objects in rooms. The object of the invention is to improve the measurement of position in rooms with different kinds of noise such as line interference, as well as permitting measurements to be made even when the source transmitting the signals is in motion.

In more specific terms, the system comprises electronic identification chips or transmitter units for attaching to the objects that have to be monitored. Each chip is equipped with a transmitter and a receiver. The chips with the transmitter units transmit on several different frequencies. On the receiver side the system comprises a plurality of detectors which are connected to a detector base unit that registers and interprets the signals transmitted from the identification chips. Detector base units in different rooms are interconnected in a network and transmit signal-processed information to one or more central units for further interpretation and sorting.

The system also permits a rough positioning to be performed within a room. This is achieved by using several receivers. This positioning is robust with regard to noise and reflections and easy and cost-effective to implement.

The method for providing a system according to the invention comprises several features involving signal processing for reducing line noise to a minimum and for receiving valid data even though the chip is in motion.

The object of the invention is achieved with a system and a method as described in the set of claims, and which will now be described in greater detail.

BRIEF DESCRIPTION OF THE DRAWINGS

The invention will furthermore be described with reference to the drawings, in which.

DETAILED DESCRIPTION OF THE INVENTION

The system according to the invention is constructed in such a manner that it should be influenced as little as possible by noise sources and should correct for Doppler effect due to movement of the transmitter units. There are several technical features of transmitter, receiver and central unit that contribute to this. In its entirety it represents a system, which is well suited to environments with various noise sources, and which can be used even though the chips transmitting signals are in motion.

Figure 1:
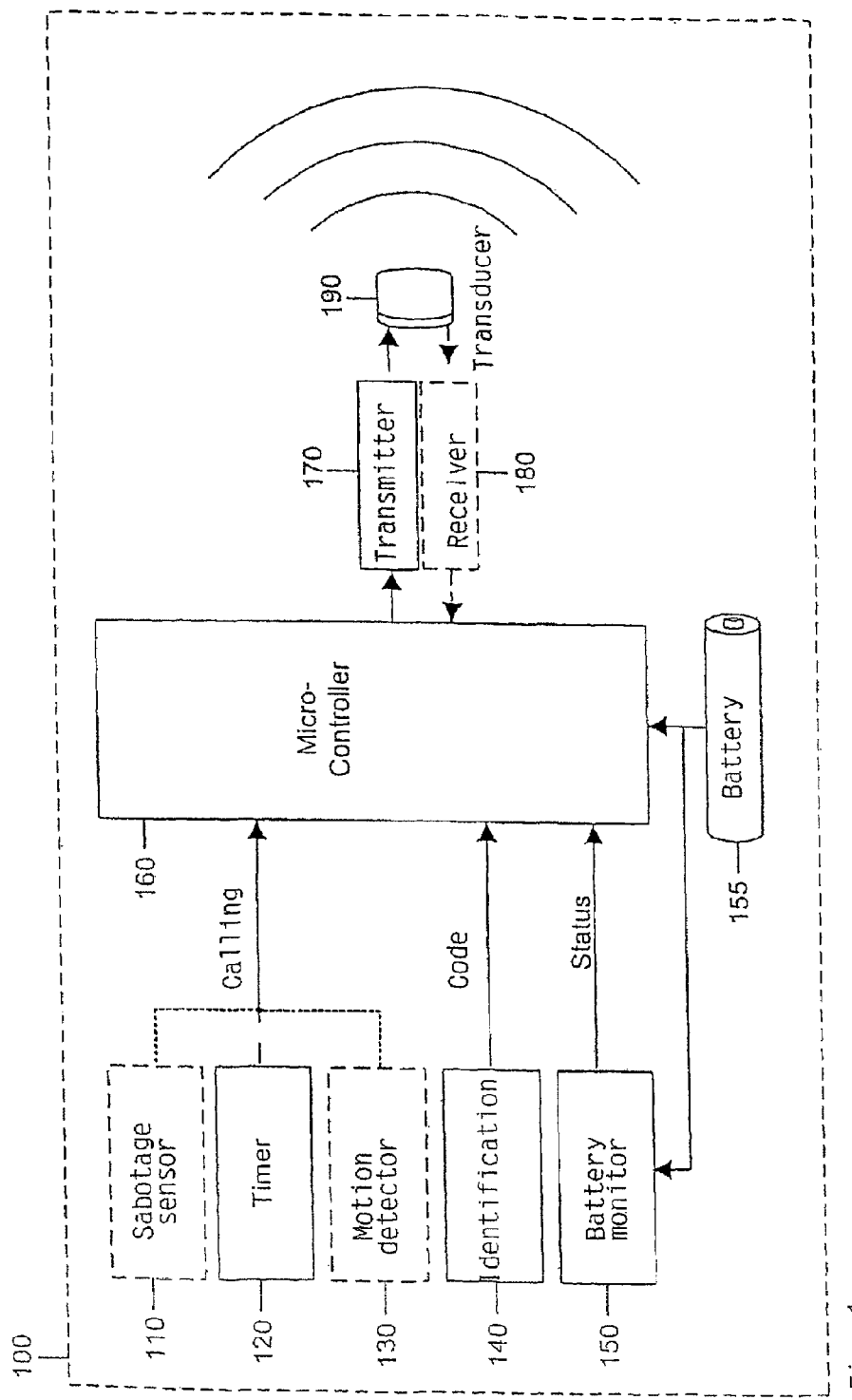
FIG. 1 illustrates the construction of a transmitter unit that transmits signals.

FIG. 1 illustrates which units may normally be incorporated in each transmitter unit 100, also called a chip. Each chip 100 is a unit, which may contain a sabotage sensor 110, a timer 120, a motion detector 130, an identification chip 140, a battery monitor 150, a microcontroller 160, a transmitter 170 and a receiver 180, and which transmits ultrasound waves by means of a transducer 190. The whole unit is supplied with power from a battery 155. The units are incorporated in a chip 100, which is attached to the object that has to be monitored. The chip or transmitter may contain all or only some of the units.

For transmitting signals the chip 100 contains a transmitter 170 and an ultrasound transducer 190 adapted for transmitting signals with several different base frequencies, together with a control unit 160 for controlling the signal transmission. The chip 100 further comprises means for determining whether other chips are transmitting signals at the same time as the chip itself intends to conduct signal transmission, and for controlling transmission of the ultrasound signals so that this only takes place when no other transmitter units are transmitting signals.

The chip 100 with transmitter unit 170 is furthermore adapted for transmitting at least two, typically eight base frequencies in the ultrasound range by means of FSK (Frequency Shift Keying).

In addition to the different base frequencies, the ultrasound transducer 190 in the chip 100 is adapted to vary the base frequencies with rising and descending frequencies in the form of chirp FSK.

The control unit 160 in the chip is adapted to activate the ultrasound transducer 190 asynchronously according to preset time frames and/or detection of motion. The control unit 160 is also adapted to activate the ultrasound transducer 190 thus causing it to start transmitting signals if an attempt is made to remove and/or open the chip 100.

The chips 100 should also respond to a call from a detector base element 200 (DBas, FIG. 2) as well as listen to other chips, while the transmitter's task is to transmit the ID code to the chip 100. This may be implemented by an inquiry from the detector base element 200 at predetermined intervals and/or when the object starts moving.

Figure 2:
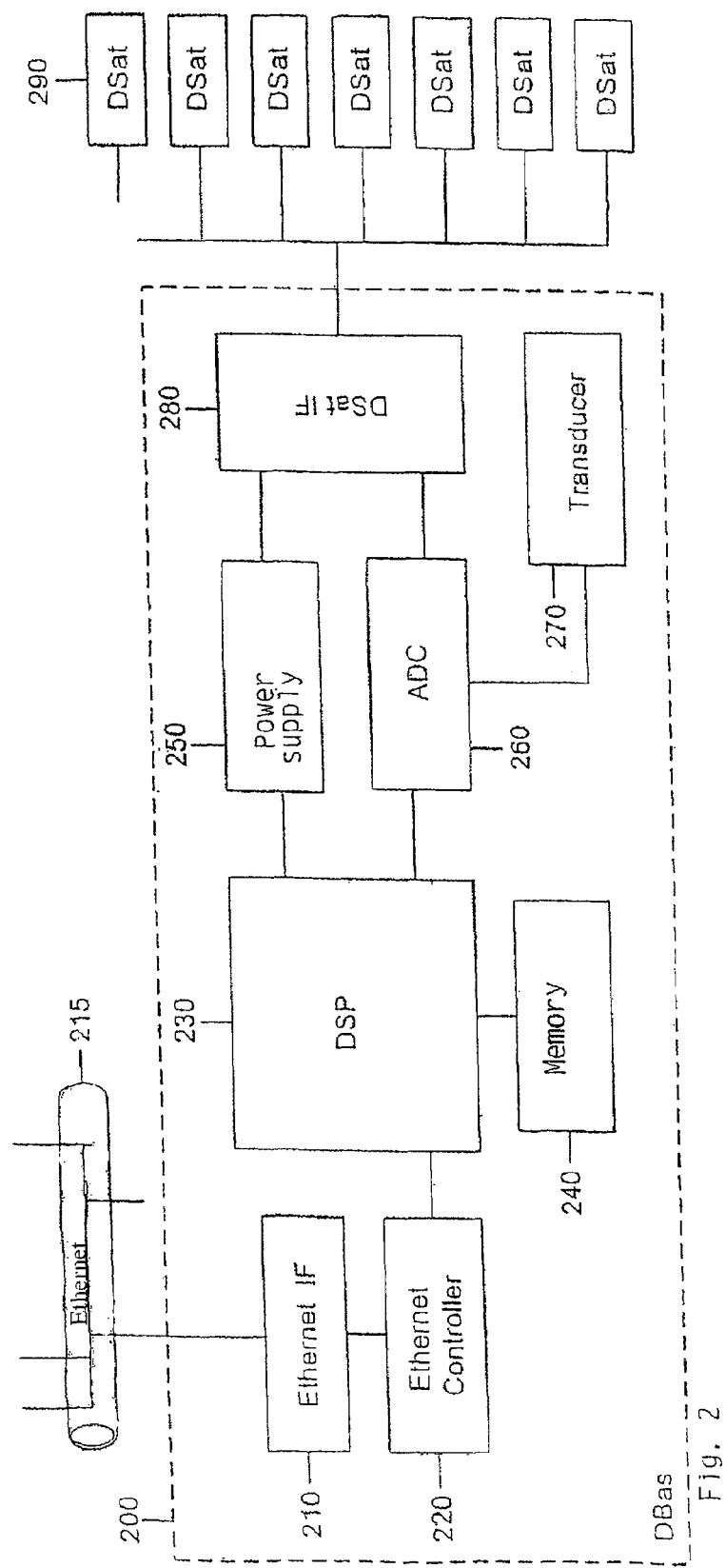
FIG. 2 illustrates the construction of a detector base element.

When a chip 100 transmits while it is in motion, the problem of Doppler shift arises. This means that the received frequency will be higher or lower than the transmitted frequency depending on whether the chip 100 is moving in a direction towards or away from a detector unit 290 (FIG. 2). By using FSK it is possible to calculate the magnitude of the Doppler shift and thereby the direction in which the chip 100 is moving relative to the detector units 290. All the chips 100 transmit on the same frequencies. Before each chip 100 transmits its ID, it listens in order to see whether there are other chips 100 transmitting. If not, it will immediately transmit its information. If there are other chips 100 transmitting, it will wait for a specific period before trying again. If so desired, the chip 100 may also include a sabotage sensor 110, which is activated when an attempt is made to remove it from the object to which it is attached, or to open it.

In a preferred embodiment each chip 100 typically transmits eight different frequencies in the ultrasound range by means of FSK. In another preferred embodiment each chip 100 transmits eight chirp FSK signals. This is particularly relevant in areas with a lot of noise. A chirp signal is a signal with varying frequency. The simplest of these is a linear FM chirp:

$$S(t)=e^{i\psi(t)}, t-[O,T]$$

where the phase is:

$$\psi(t)=\pi\mu^2+2\pi f_0 t$$

Instantaneous frequency is the derivative of the phase and becomes:

$$f=f_0+\mu t.$$

Typical values for chirp rate, A, are such that the chirp varies over a frequency range that is greater than the Doppler shift, but less than the distance between the frequencies. At $f_0$=40 kHz and velocity +/−6 km/h, the Doppler shift is approximately +/−200 Hz. In the chips, account is taken of the fact that the different frequencies are at intervals between 700 and 1000 Hz. A typical chirp range may therefore be: $\mu T$=4-500 Hz.

FIG. 2 shows which units normally can be incorporated in each detector base unit 200 (DBas) located in a room. One or more detector units 290 (DSat) that are independent of one another are placed in the room. They are connected to the detector base unit 200, which receives and samples several fixed channels numbering at least two, but typically eight. The signals from the detector units 290 are fed to an interface 280 (DSat IF), and subsequently converted in an analog to digital converter 260 (ADC). The coding used is based on frequency shift keying (FSK). A circuit 230 for digital signal processing (DSP) processes the data stream and derives information by means of a method according to the invention. This in turn is connected to a memory circuit 240 which is used for intermediate storage of the data before ready-processed data are transmitted to a central unit 410 (FIG. 4) via an Ethernet controller 220 and an interface 210. Other controllers and interfaces may be used if the system has to be set up with a different type of network, such as, for example, a wireless network or communication via the power grid. The transducer 270, which is incorporated in the detector base element 200, is used for transmitting signals and calls to the various chips 100, and for receiving. The signals transmitted are controlled from a central unit 410 connected to the network.

The detector base unit 200 further comprises:

An A/D converter 260 for receiving and sampling several different signals, means 230 for performing the following steps for processing the received data:

analog to digital conversion of the sampled signals;

transmission to a memory 240 for intermediate storage of digitized signals;

categorization of the signals in frequency blocks for further processing with Fourier transform for calculation of Doppler shift from the position to the frequency block with the strongest signal;

use of line detector for detection of single-frequency noise sources on the different signals for correcting and providing accepted data;

pattern comparison over all bits in order to determine a signature which is characterizing for time and Doppler shift;

warning to a central unit 410 via a network interface 215 when a sufficient volume of accepted data has been processed and is ready for further processing in the central unit 410, and transmission of the data to the central unit 410.

Figure 3:
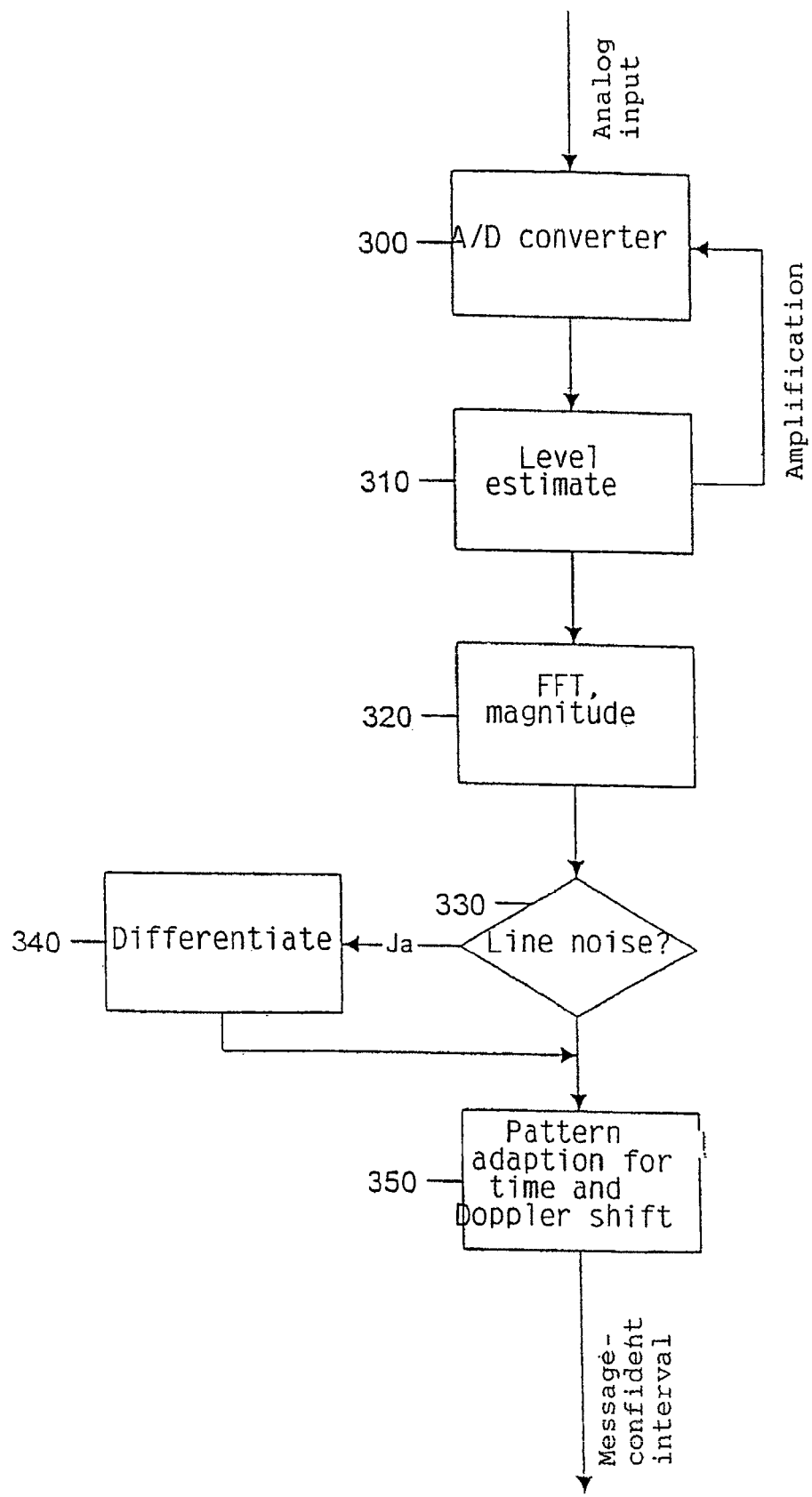
FIG. 3 illustrates the data flow from input to output in the detector base element.
Figure 4:
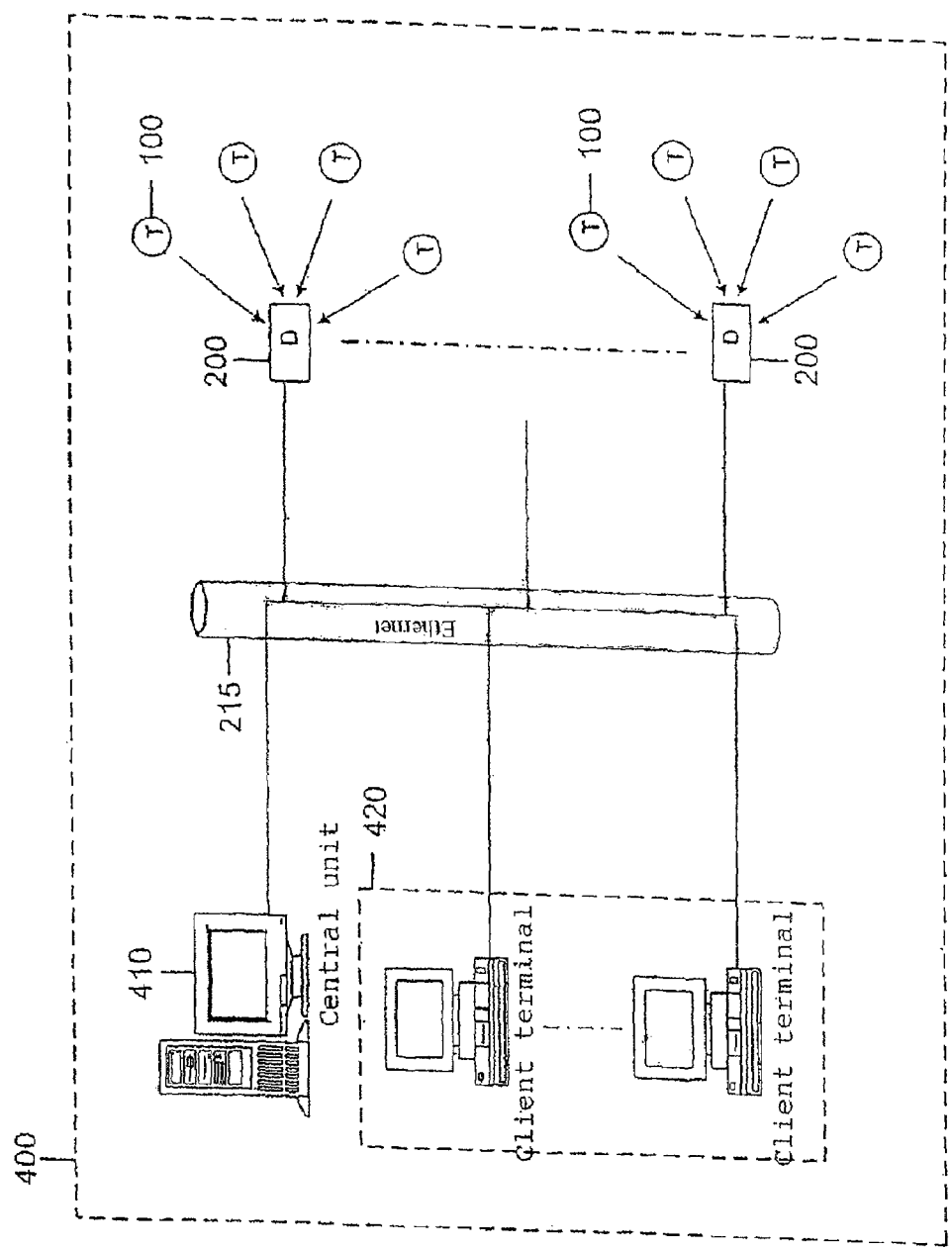
FIG. 4 illustrates how the whole system is interconnected in a network.

FIG. 3 illustrates a flow chart of the signal processing that takes place in different steps in the detector base unit. The detector base unit 200 comprises an A/D converter 260 for receiving and sampling several different signals. The input on the A/D converter 260 is fed with analog signals from the detector units 290 via an interface 280 (step 300), and the received levels are subjected to a level estimate (step 310) and may be reinforced if they are below a minimum level. A categorization is then performed of the signals into frequency blocks for further processing with Fourier transform (step 320) for calculation of Doppler shift from the position to the frequency block with the strongest signal. A line detector measures and evaluates line noise (step 330) that intrudes into each detector base unit 200, for detection of single-frequency noise sources on the various signals, and for correcting and providing accepted data. If the line noise is above a certain level, a differentiation and filtering is performed (step 340) in order to exclude the unwanted signals. After this, a pattern comparison will be performed of the signals (step 350) in order to determine a signature that is characterizing for time and Doppler shift. The resulting and filtered signals are now ready to be transmitted via the network for further processing in a central unit 410 (FIG. 4). The central unit 410 is warned via a network 215 when a sufficient volume of accepted data has been processed and is ready for further processing. The data are then transmitted to the central unit 410 for further processing.

As already mentioned, in areas with a great deal of noise it may be an advantage for the chips 100 to transmit signals in the form of chirp FSK. The system is designed for this. When the chips transmit chirp FSK signals, the detector base unit 200 employs fractional Fourier transform (step 320, FIG. 3) in the signal processing. In detecting chirp FSK signals, the detector first performs a de-chirping of the received signals, followed by frequency analysis (FFT, pattern recognition, thresholding, etc.). Each block of data, x[n], n=0, . . . , N−1, first has to be multiplied by a complex de-chirp, where the centre frequency is already included in the FFT calculation, i.e. a chirp with phase $-\pi\mu^2$. The de-chirp is set up so that it has the 0 phase in the middle of the block. Constant frequencies will then be scattered outwards in frequency, while the chirp signals that match the de-chirp rate will be collected. This algorithm can also be formulated as a fractional Fourier transform. This method will reduce noise with constant frequencies to a minimum.

FIG. 4 provides an overview of the whole system 400 according to the invention. The figure illustrates the interplay between chips 100, detectors 200, 290 and a central unit 410 in the form of a PC which coordinates all received data. Several client terminals 420 may be connected to the system in order to gain access to information from different locations.

For position determination of at least one transmitter unit in rooms with various kinds of noise such as line interference, the system comprises:

at least one transmitter unit 100 with one ultrasound transducer 190 for transmitting signals on several different frequencies, at least two detector units 290 for detecting ultrasound signals, at least one detector base unit 200 for signal processing connected to the detector units 290, a network 215 that interconnects several detector base units 200, plus at least one central unit 410 for acquisition and interpretation of processed data from detector base units 200 via the network connection 215, and where the data volume transmitted from the detector base units 200 to the central unit(s) 410 is reduced to a minimum since signal noise and non-essential signal components are substantially removed from the signals by means of signal processing in the detector unit 200 before transmission of the signals to the central unit(s) 410, plus processing means in the central unit(s) 410 for determining the position of a transmitter unit 100.

As already mentioned, the signal strength received by each of the detector units 290 will determine which detector unit 290 is closest to the chip 100 that is transmitting the signals, and the position of the chip 100 that is transmitting its ID can thereby be determined. To enable this to take place, the system must be calibrated in such a manner that the position of all the detector units 290 located in the same room is determined in relation to the geometry in the room. The result of this calibration is input as parameters in the central unit(s) 410 for calculating the position of a chip in relation to which detector units 290 receive the strongest signal.

The method according to the invention for determining the position of one or more transmitter units or chips 100 in rooms with various noise sources such as line interference comprises:

transmitting from the chip 100 ultrasound signals with several different frequencies, sampling the signals in a detector base unit 200 received from transducer 270 and at least one detector unit 290, and furthermore performing the following steps for processing the received data:

analog to digital conversion of the sampled signals;

intermediate storage of sampled and accumulated values;

categorization of resulting data from the signals in frequency blocks for further processing with Fourier transform for calculation of Doppler shift based on the position of the frequency block with the strongest signal;

differentiating filtering as a function of time for reduction of single-frequency noise sources on the different signals, in order to obtain accepted data;

pattern comparison over all bits in order to determine a signature which is characterizing for time and Doppler shift;

warning to a central unit 410 via a network interface 215 when a sufficient volume of accepted data has been processed in the detector base unit(s) 200 and is ready for further processing in the central unit 410;

transmission of the data to the central unit 410, and comparison of received signal parameters in the central unit 410 from several detector units 290 in a room for determining the position of chips 100 in the room.

A typical example of how the system works in practice will now be described. When an operator of a central unit 410 or a client terminal 420 wishes to know the location of a specific object tagged by a chip 100, the operator will perform an action on his central unit 410 or terminal 420 which initiates a search in the database of the last messages received from the chip.

The chip 100 has initiated a transmission routine in advance. As mentioned previously, this involves listening to other chips 100 in order to see whether any others are currently transmitting signals. If so, the chip 100 will wait for a predetermined period. If no other chips 100 are transmitting, the chip concerned 100 starts transmitting signals. The detector base unit 200 intercepts these. The analog signals received by the various detector units 290 and the transducer 270 are transmitted to the input of the A/D converter 260 in the detector base unit 200. The signal processing according to the invention will then be initiated, and the resulting data stream at the output of the detector base unit 200 is transmitted via the network 215 to the central unit(s) 410 or terminal(s) 420 which first initiated the call. Here the data are further interpreted, thus enabling the position of the object to which the chip 100 is attached to be determined.

The system 400, which is described in its entirety above, is flexible and simple to construct. By increasing the number of detector units 290 in the same room, the accuracy of the position determination will increase. Maintenance, expansion and upgrading will be easy, since the system 400 is controlled and administered from a central control unit, such as, for example, a PC in a network or, for example, a PDA in a wireless network.

The main features according to the invention are that the system can find the position of objects even though they are in motion and in areas with various kinds of line noise. The system is therefore both flexible and cost-effective.

What is claimed is:

1. A method of determining the position of a transmitter unit comprising the steps of:
   transmitting from the transmitter unit an FSK-encoded acoustic signal;
   receiving said signal at a first detector unit;
   receiving said signal at a second detector unit connected to the first detector unit by a network;
   comparing the signal strength received by the first detector unit with that received by the second detector unit; and
   determining from said comparison an estimate of the position of the transmitter unit.

2. The method of claim 1 further comprising determining from said comparison whether the transmitter unit is nearer to the first detector unit or nearer to the second detector unit.

3. The method of claim 1 further comprising performing a calibration operation to determine the position of the first and second detector units in relation to the geometry of a room.

4. The method of claim 1 further comprising:
   receiving said signal at one or more further detector units connected to the first detector unit by a network;
   comparing the signal strength received by each of the first, second, and one or more further detector units; and
   determining from said comparison an estimate of the position of the transmitter unit.

5. A method of determining the position of a transmitter in a room comprising the steps of:
   transmitting from the transmitter ultrasound signals with different frequencies;
   receiving the signals at a first receiver in the room;
   receiving the signals at a second receiver in the room;
   comparing received signal strengths from the first and second receivers; and
   determining from said comparison an estimate of the position of the transmitter in the room.

6. The method of claim 5 further comprising determining from said comparison whether the transmitter is nearer to the first receiver or nearer to the second receiver.

7. The method of claim 5 further comprising performing a calibration operation to determine the position of the first and second receivers in the relation to the geometry of the room.

8. A system for determining the position of a transmitter unit comprising:
   a transmitter unit arranged to transmit an FSK-encoded acoustic signal;
   a first detector unit arranged to receive said signal;
   a second detector unit arranged to receive said signal;
   a network connecting said first detector unit with said second detector unit; and
   a central unit in network communication with said first and second detector units and arranged to compare the signal strength received by the first detector unit with that received by the second detector unit, and to determine from said comparison an estimate of the position of the transmitter unit.

9. A system for determining the position of a transmitter in a room comprising:
   a transmitter with an ultrasound transducer for transmitting signals on several different base frequencies;
   a first receiver in the room arranged to receive signals from the transmitter;
   a second receiver in the room arranged to receive signals from the transmitter; and
   a central unit in communication with said first and second receivers and arranged to compare received signal strengths from the first and second receivers, and to determine from said comparison an estimate of the position of the transmitter in the room.

10. A central control unit for a position-determining system arranged to:
    receive first data relating to ultrasound signals transmitted by a transmitter unit and received by a first receiver unit located in a room;
    receive second data relating to said ultrasound signals received by a second receiver unit located in said room; and
    process said first and second data to compare received signal strengths and to determine from said comparison an estimate of the position of the transmitter unit in the room.

11. A method of determining the location of an acoustic transmitter unit in an environment containing line noise comprising the steps of:
    measuring and evaluating line noise with a line noise detector;
    receiving an acoustic signal from the transmitter unit;
    selectively filtering unwanted signals detected by the line noise detector; and
    determining the location of the acoustic transmitter unit from said received signal.

12. A method as in claim 11 further comprising performing the step of selectively filtering unwanted signals only if the line noise is above a predetermined level.

* * * * *